Sept. 22, 1964  S. FINCH  3,149,942
FILTERS FOR GASES
Filed Jan. 10, 1961  2 Sheets-Sheet 1
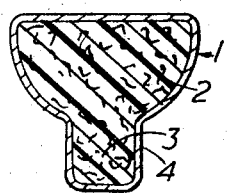
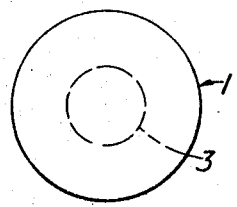
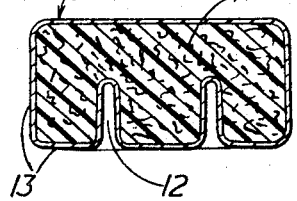
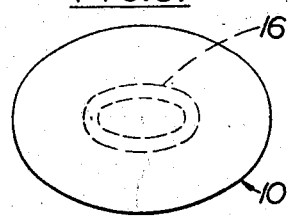
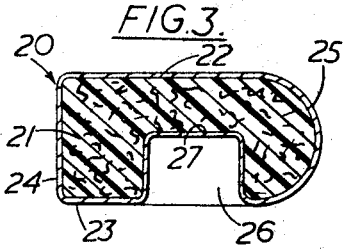
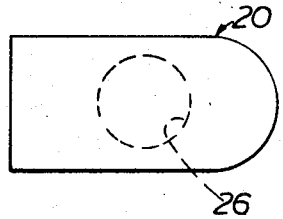
Inventor
Samuel Finch
BY
E. W. Christen
Attorney

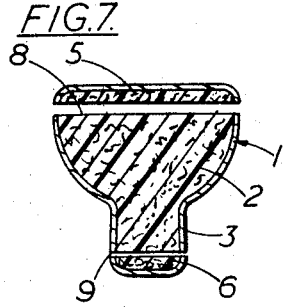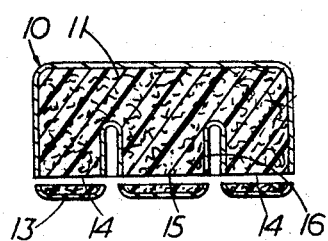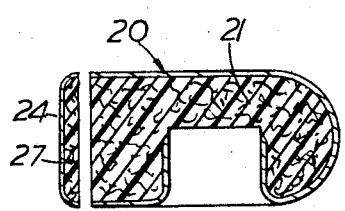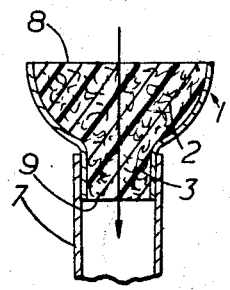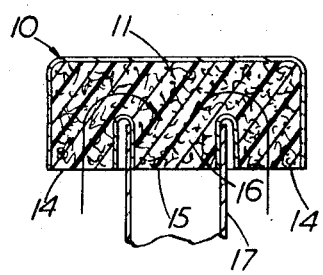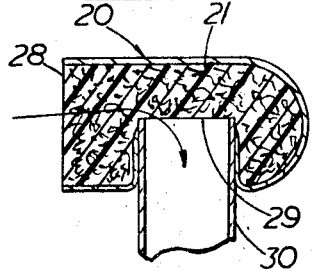

United States Patent Office 3,149,942
Patented Sept. 22, 1964

---

3,149,942
FILTERS FOR GASES
Samuel Finch, Studham, England, assignor to General Motors Corporation, Detroit, Mich., a corporation of Delaware
Filed Jan. 10, 1961, Ser. No. 81,763
Claims priority, application Great Britain Jan. 12, 1960
3 Claims. (Cl. 55—495)

This invention relates to filters for gases and more particularly to air filters for internal combustion engines. The invention is applicable in particular to air cleaners such as are placed on the filler pipe of the crankcase of an internal combustion engine and are referred to as breathers.

According to the invention a filter for gases comprises a mass of foam plastics or like material having interconnected cells, said mass being completely enclosed by an integral impermeable skin except at locations thereon which constitute an inlet for gas to be filtered and an outlet for filtered gas.

The foam plastics material should have sufficient rigidity to be self-supporting and desirably should be resistant to the action of materials with which it will be brought into contact during use, to the temperatures to which it will be subjected in use, and to deterioration by ageing. The particular foam plastics material employed will depend on the intended use of the filter, but polyurethane, polystyrene, polyethylene, polyester, polyether and synthetic rubber foam plastic materials may be employed.

An air filter according to the invention does not require to be supported in a container, such as is customary with air filters in use at the present time, the impermeable skin on the filter according to the invention constituting an integral container for the foam plastics material enclosed thereby.

A filter according to the invention is preferably made by a moulding operation by which a body of the foam plastics material, of a suitable shape, is foamed with an integral skin completely enclosing the foam material. After removal from the mould portions of the skin are removed, as by cutting, so as to expose portions of the foam plastics material at locations which constitute the inlet and outlet of the filter.

The mass of foam plastics material is moulded so that the portion which comprises the outlet of the filter can be readily inserted into, or applied over the end of, an intake pipe to which the filter is to be fitted, the inherent resilience of the foam plastics material enabling a secure attachment between the filter and the tube to be obtained by appropriate dimensioning of the part to be applied to the tube.

The scope of the invention is defined by the appended claims; and the invention and the manner in which it is to be performed are hereinafter particularly described with reference to the accompanying drawings in which:

FIGURES 1 to 3 are vertical sections respectively through three different forms of filter according to the invention, in a first stage of manufacture thereof;

FIGURES 4 to 6 are plans respectively of FIGURES 1 to 3;

FIGURES 7 to 9 are views respectively similar to FIGURES 1 to 3, but showing a second stage in the manufacture of the filters;

FIGURES 10 to 12 are views respectively similar to FIGURES 7 to 9, but showing each filter mounted on an intake pipe.

The filter shown in FIGURES 1, 4, 7 and 10 is for use as a breather on the crankcase of an internal combustion engine. To make it, a mass of foam plastics material 1, for example a polyurethane foam having interconnected cells, is formed by a moulding operation into a shape which is approximately that of a hemisphere 2 with a coaxial tubular portion 3 extending from the curved surface thereof. The moulding operation has the effect of producing an external impermeable skin 4 on the foam plastics material 1 and after removal from the mould this skin, and a portion of the adjacent foam plastics material, is removed from the end of the tubular extension 3, and from the circular plane face of the hemispherical portion 2, by cutting off thin layers 5, 6 of the material from each of these two places (FIGURE 4). The resulting breather can then be applied to the filler pipe 7 of a crankcase (as shown in FIGURE 7) by fitting the tubular portion 3 into the open end of the filler pipe 7, the diameter of the tubular portion 3 being such that the tubular portion is slightly compressed so as to have a friction fit with the filler pipe 7 when inserted therein. Air enters through the cells of the foam plastics material at the exposed plane face 8 of the hemispherical portion 2 and is filtered as it passes through the interconnecting cells of the foam before passing out through the exposed face 9 of the foam at the end of the tubular extension 3.

The foam plastics material may be treated (as described in co-pending application No. 862,085 assigned to the assignees of the present invention and now abandoned) by applying thereto an amount of oil or other non drying liquid so as to form a film on the walls of the cells to assist the retention of particles of foreign matter which are entrained in the air which passes through the filter.

In the embodiment shown in FIGURES 2, 5, 8 and 11 a breather 10 is formed as a moulded circular slab 11 of foam plastics material, such as that used for the breather shown in FIGURES 1, 4, 7 and 10, on one face of which there is an annular groove 12 which extends for approximately half the thickness of the slab 11. An integral impermeable skin 13 formed on the slab 11 during the moulding operation is removed at the face of the slab 11 at which lies the open end of the annular groove 12, the slab 11 thus having an annular surface 14 at which the foam plastic is exposed, constituting the inlet of the breather, and a coaxial circular surface 15 at which the foam is exposed, constituting the outlet of the breather, this circular surface 15 lying at the end of a tubular portion 16, formed by the inner wall of the annular groove 12. The tubular portion 16 adjacent the outlet 15 can be fitted into the end of an intake pipe, as described in the first embodiment.

In a third embodiment of the invention, shown in FIGURES 3, 6, 9 and 12 a breather 20 comprises a slab 21 of moulded foam plastics material having parallel upper and lower flat faces 22, 23 respectively, and a plane and a curved surface 24, 25 respectively at opposite ends. In the lower face 23 there is a tubular recess 26.

After the moulding operation a portion of the integral impermeable skin 27 formed on the foam material is removed from the end surface 24 and a portion of the impermeable skin 27 at the base of the tubular recess 26 is removed so as to leave surfaces 28, 29 respectively at which are exposed the interconnected cells of the foam material 21 at these two locations. The tubular recess 26 constitutes a socket by which the breather 20 can be fitted over the open end af a crankcase filled pipe 30, the surface 28 of the foam plastic slab 21 constituting the inlet, and the surface 29 at the base of the recess 26 constituting the outlet of the breather.

A preferred foam plastics material for use in making a filter according to the invention is a polyurethane foam material having interconnected cells the density being about 30 to 100 cells per linear inch and the density of the material being about 1.7 to 2.2 pounds per cubic foot. Such material and methods for its manufacture are disclosed in the specifications of copending application No. 862,085 assigned to the assignee of the present invention and now abandoned.

In moulding the polyurethane foam material the normal chilling effect of the mould is sufficient to produce an impermeable skin on the foam material; such effect may be increased, if necessary, by using a chilled mould.

I claim:

1. A self-supporting filter element comprising a mass of foam plastic material having interconnected cells, said foam material being wetted with a non-drying oil, said mass terminating in an impermeable skin completely enclosing said mass except at locations thereon which constitute an inlet for gas to be filtered and an outlet for filtered gas, said skin supporting and containing said mass and providing a casing for said filter element.

2. A self-supporting filter element comprising a mass of foam plastic material having interconnected cells, said mass terminating in an impermeable skin completely enclosing said mass except at locations thereon which constitute an inlet for gas to be filtered and an outlet for filtered gas, the surface at the location constituting the filter outlet being at the end of a tubular extension from said mass of foam plastic material, said skin supporting and containing said mass and providing a casing for said filter element.

3. A self-supporting filter element comprising a mass of foam plastic material having interconnected cells, said mass terminating in an impermeable skin completely enclosing said mass except at locations thereon which constitute an inlet for gas to be filtered and an outlet for filtered gas, the surface at the location constituting the filter outlet being at the end of a tubular recess in said mass of foam plastic material, said skin supporting and containing said mass and providing a casing for said filter element.

References Cited in the file of this patent
UNITED STATES PATENTS

| | | |
|---|---|---|
| 2,019,241 | Weiss | Oct. 29, 1935 |
| 2,770,241 | Winkler | Nov. 13, 1956 |
| 2,999,562 | Lechtenberg | Sept. 12, 1961 |